United States Patent

[11] 3,540,601

[72] Inventor Leroy E. Hutchison
 Highland Park, New Jersey (85 Coleman St., Edison, NJ 08817)
[21] Appl. No. 678,673
[22] Filed Oct. 27, 1967
[45] Patented Nov. 17, 1970

[54] AUTO CLOTHING EXTENSION HANGER
 1 Claim, 2 Drawing Figs.
[52] U.S. Cl. ........................................................ 211/32, 211/87, 211/123
[51] Int. Cl. ....................................................... A47f 7/06
[50] Field of Search ........................................... 211/86, 87, 32, 123; 248/317, 227; 211/30

[56] References Cited
UNITED STATES PATENTS

| | | | |
|---|---|---|---|
| 1,233,576 | 7/1917 | Higgins | 211/7 |
| 1,324,180 | 12/1919 | Shupp | 211/7 |
| 2,025,437 | 12/1935 | Brown | 211/32 |
| 2,512,203 | 6/1950 | Fluharty | 211/123 |
| 3,185,312 | 5/1965 | Dzienisiewics | 211/87 |

*Primary Examiner*—Roy D. Frazier
*Assistant Examiner*—Abraham Frankel

ABSTRACT: An attachment to an automobile garment hanger, the attachment providing a means for supporting a relatively large number of garments, supported upon garment hangers, a relatively large number of neckties and belts as well as a hat.

Patented Nov. 17, 1970 3,540,601
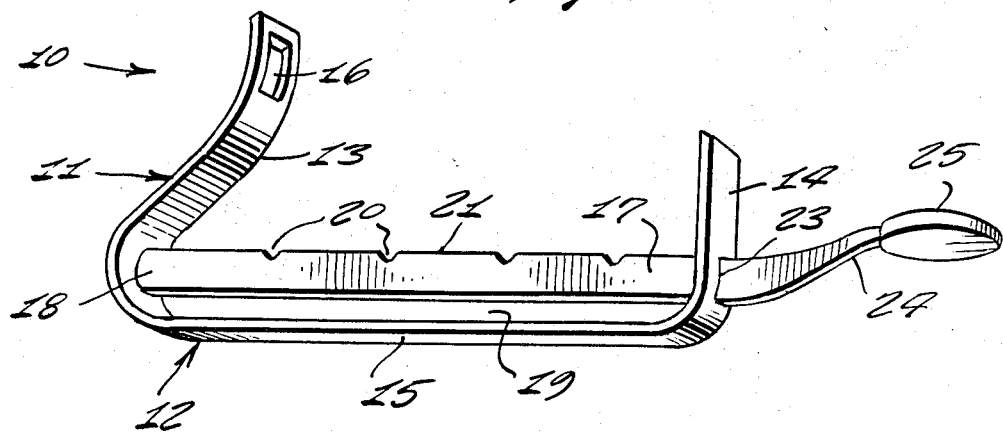
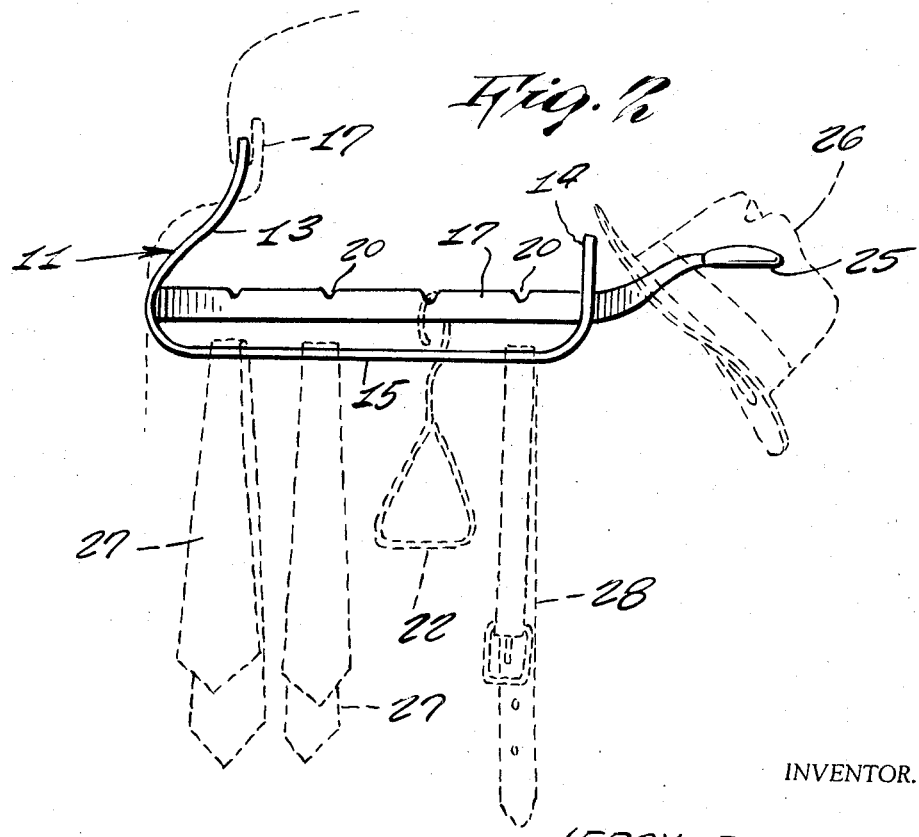
INVENTOR.
LEROY E. HUTCHISON

AUTO CLOTHING EXTENSION HANGER

This invention relates generally to garment hanger racks. More specifically it relates to garment hanger racks for automobiles.

A principal object of the present invention is to provide an automobile clothing extension hanger which is readily securable to the conventional garment hanger of an automobile, and which provides additional support for a relatively large number of garments, neckties, belts and a hat.

Another object of the present invention is to provide an automobile clothing extension hanger which comprises a single part that can be readily snapped over the conventional automobile garment hanger.

Yet a further object of the present invention is to provide an automobile clothing extension hanger which can be readily made in plastic or metal material, as preferred by the manufacturer.

Still a further object of the present invention is to provide an automobile clothing extension hanger which when not in operative use may be conveniently stored within the glove compartment of the vehicle.

Still a further object is to provide an automobile extension hanger which would be particularly adaptable for use when traveling on long trips during which a person is obliged to carry a relatively large number of clothing therealong.

Other objects of the present invention are to provide an automobile clothing extension hanger which is simple in design, inexpensive to manufacture, rugged in construction, easy to use and efficient in operation.

These and other objects will be readily evident upon a study of the following specification and the accompanying drawing wherein:

FIG. 1 is a perspective view of the present invention;

FIG. 2 is a side elevation view thereof shown in operative use.

Referring now to the drawing in detail, the reference numeral 10 represents an automobile clothing extension hanger, according to the present invention, wherein there is a one-piece member 11 made preferably from metal or rigid plastic and which includes a generally U-shaped frame 12 comprised of spaced apart legs 13 and 14, which are interconnected at their one ends by an intermediate leg 15.

The leg 13 comprises an arched element having an opening 16 near the upper end thereof for the purpose of receiving therein the garment hanger hook 17 that comprises a standard part of automobiles. The leg 14 comprises a straight member extending vertically upward and which provides a support near one end of a horizontally extending bar 17 which is connected at its one end 18 to a side of the leg 13, the bar 17 being located in parallel, spaced apart relationship above the interconnecting leg 15 so as to provide a space 19 therebetween.

The bar 17 is provided with a plurality of notches 20 along its upper edge 21 for the purpose of securing a plurality of conventional garment hangers 22 therefrom. The bar 17 extends through an opening 23 in the wall of the leg 14, the bar 17 then having an upwardly turned end portion 24 having a pad 25 at its terminal end for the purpose of supporting a hat 26 thereupon.

In operative use, the automobile clothing extension hanger 10 is supported from the automobile garment hanger hook 17 as shown in FIG. 2 of the drawing. A hat is placed upon the pad and a plurality of garment hangers are supported from the notches 20 of the bar 17. A plurality of neckwear such as scarfs and neckties 27 may be fitted through the space 19 so that the same may be supported over the interconnecting leg 15. Likewise belts 28 and other items of wear may be also supported therefrom.

Thus there has been shown an improved device for being carried within an automotive vehicle and which will provide a relatively large support for carrying a large quantity of garments and associated items.

While various changes may be made in the detailed construction, it is understood that such changes will be within the spirit and scope of the present invention as is defined by the appended claims.

I claim:

1. An automobile clothing extension hanger, said hanger including a generally U-shaped element and a bar element rigidly affixed together, said U-shaped element comprising a pair of spaced apart legs, said legs extending upwardly, one of said legs being arched, the lower ends of said legs being interconnected to opposite ends of an integrally formed intermediate horizontal interconnecting leg, and the upper end of said arched leg having an opening therein for receiving there through a conventional automobile garment hanger hook, said bar comprising a member extending in parallel, spaced-apart relation above said interconnecting leg, said space between said bar and said interconnecting leg providing a means for inserting neckwear, belts, and other garment items therethrough for being supported over said interconnecting leg, and said bar having a plurality of notches upon its upper edge into which conventional garment hangers may be hooked for support therefrom, said bar being rigidly connected at one end to said arched leg, the opposite end of said bar extending through said other vertical leg and being rigidly affixed thereto, said bar having an extending terminal portion that is upwardly arched at an angle and having a pad on the terminal thereof upon which a hat may be supported.